United States Patent [19]

Rampelberg

[11] 4,263,077

[45] Apr. 21, 1981

[54] IN-PRESS TRANSFER PAINTING OF HARDBOARD

[75] Inventor: Victor H. Rampelberg, Flossmoor, Ill.

[73] Assignee: Avery International Corporation, San Marino, Calif.

[21] Appl. No.: 905,129

[22] Filed: May 12, 1978

[51] Int. Cl.[3] .............................................. B32B 31/00

[52] U.S. Cl. .................................... 156/238; 156/240; 156/277; 156/279; 156/307.5; 156/315; 427/152; 427/408; 428/151; 428/165; 264/113

[58] Field of Search .................... 156/62.2, 62.4, 62.6, 156/62.8, 230, 234, 238, 240, 277, 243, 245, 315, 278, 323, 279, 307.5; 264/113, 122, 123, 126, 128, 124, 119, 125; 428/151, 205, 207, 914; 427/152, 206, 408

[56] References Cited

U.S. PATENT DOCUMENTS

| | | | |
|---|---|---|---|
| 3,185,614 | 5/1965 | Hartesveldt et al. | 264/123 X |
| 3,511,731 | 5/1970 | Raynal | 156/230 |
| 3,661,672 | 5/1972 | McQuade, Jr. | 156/240 X |
| 3,846,219 | 11/1974 | Kunz | 156/62.2 X |

FOREIGN PATENT DOCUMENTS

| | | | |
|---|---|---|---|
| 1113695 | 5/1968 | United Kingdom | 156/240 |

*Primary Examiner*—John T. Goolkasian
*Assistant Examiner*—Thomas Bokan
*Attorney, Agent, or Firm*—Christie, Parker & Hale

[57] ABSTRACT

A painted surface is applied to a piece of hardboard simultaneously while the board is being formed in a press. A heat-resistant paint layer is coated onto a carrier, and the painted carrier is placed over a loose layer of exploded wood fibers in a heated press. The press applies pressure in excess of 400 psi and heat above 400° F. to compact the wood fibers into an integral hardboard piece while the heat from the press simultaneously transfers the paint layer from the carrier and bonds it to a surface of the board. In one embodiment of the invention, the paint layer is a thermosetting resinous paint system, and the paint coat is sufficiently heat-resistant to remain in a hardened condition at or above the temperature at which the board is formed, thus forming a separate hardened paint layer on the surface of the board. The carrier can include an adherence coat which is heat-activated in the press to crosslink and bond the paint layer to the wood fibers.

30 Claims, 5 Drawing Figures

Fig. 1
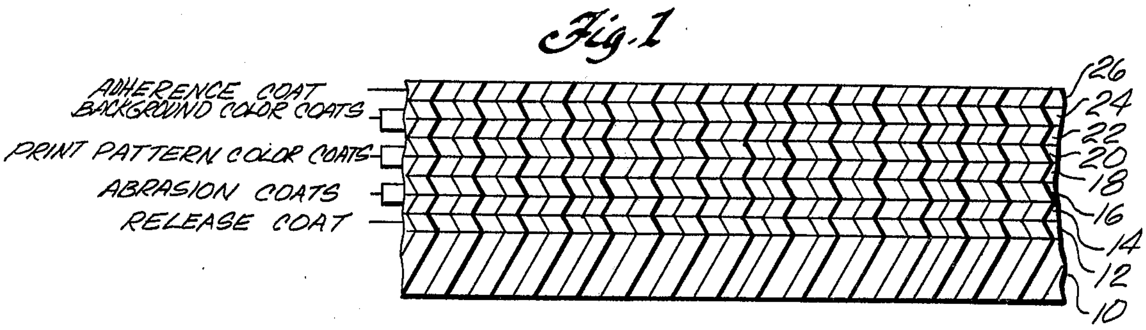
Fig. 2
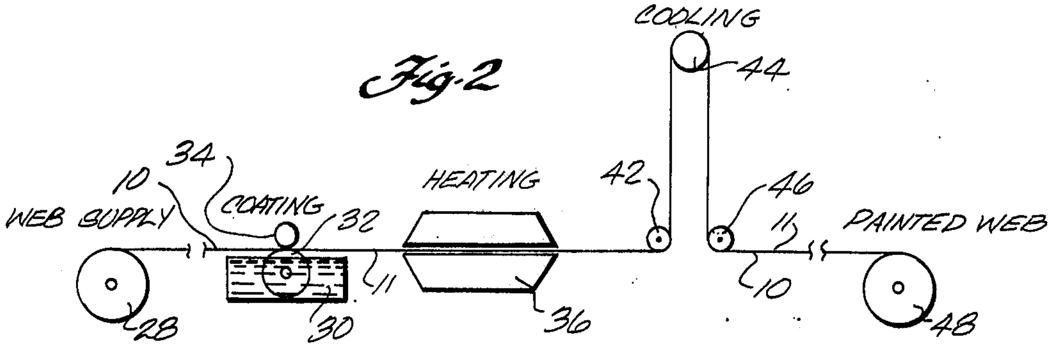
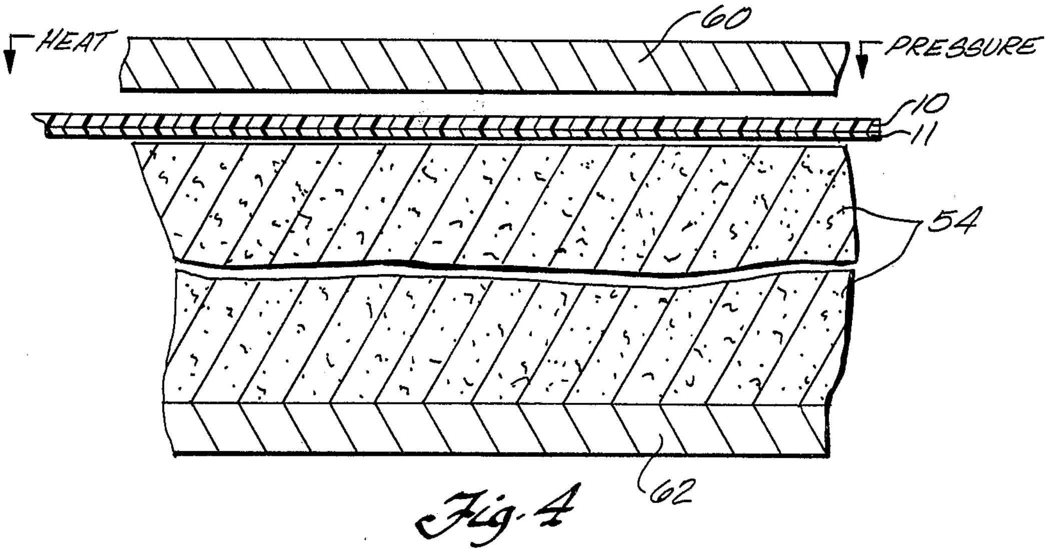
Fig. 4

IN-PRESS TRANSFER PAINTING OF HARDBOARD

BACKGROUND

This invention provides an in-press method for applying a painted surface to a piece of hardboard or fiberboard while the board is being formed in a press.

Over 20 billion square feet of wood hardboard and fiberboard are produced annually. Most of this footage goes into house and furniture construction such as sheathing, acoustical tile, siding, paneling, underlayment, dustproofing, drawer bottoms, case backs and doors. Hardboard and fiberboard can be produced by thermomechanical pulping and hot press densification techniques first developed by William Mason in 1925.

Hardboard and fiberboard are generally manufactured from exploded wood fibers which are loosely stacked as a layer in a press and compacted under heat and pressure to form a relatively dense and rigid board. Raw materials for the board can come from whole wood, sawdust and mill residues, waste paper, agricultural wastes, and plant tissue other than woody stems. Most hardboard and fiberboard manufactured today is produced by thermomechanical pulping in which the raw material is placed in a cylinder under heat and pressure and exploded through an opening similar to a constrictive nozzle to fragment the material into a mixture of fiber, fiber bundles, and hard shives. The exploded wood fibers are placed in a heated press, and the press platens apply pressure of approximately 500 to 750 psi and heat in excess of 400° F. to compress the fibrous mass into a relatively rigid board. The thickness of the original layer of loose wood fibers can be reduced up to about 16 times its original size during the pressing operation.

There are distinctions between "hardboard" and "fiberboard" as they are known in the industry. Hardboard is a high density board which can be embossed and machined, and the product sold under the trademark Masonite is typical. Hardboard is formed from exploded wood fibers essentially without any added binders or other additives. The high lignin content of the wood fibers fuses the fibers together when heat and pressure are applied in the press.

Fiberboard is a somewhat medium density board which is also made from exploded wood fibers, except that a small amount, say about 5% by weight, of added binders or other additives are included in the raw material which goes into the press.

The present invention can be used for both hardboard and fiberboard, although the description to follow will refer only to hardboard for simplicity.

After the hardboard is formed in the press, a finished surface can be applied by passing the hardboard to a separate finishing plant where the surfaces are sanded or polished in preparation for applying decorative and protective paint layers or laminae.

The finishing operation is expensive and time-consuming. The cost of a second press for applying decorative laminae can greatly increase the cost of the finished product as well as requiring the additional time to finish the product.

A separate painting operation requires a long production line having spray equipment, or the like, for applying the paint, ovens for drying the paint, and equipment for exhausting paint vapors from the working areas of the plant. In addition, control measures are required for keeping dust particles away from the painted surfaces and to avoid runoff on high spots of the finished board. The cost of the separate production line for applying painted surfaces can greatly increase the cost of the finished board as well as adding to the time required to produce it.

This invention provides a method for forming hardboard and simultaneously applying a painted surface to the board while it is being formed in the press. Thus, secondary finishing processes for applying decorative laminae or painted surfaces are eliminated.

SUMMARY OF THE INVENTION

Briefly, the invention includes the steps of placing in a press a loose layer containing wood fibers, and placing over the fibrous layer a carrier sheet having a hardened paint coat which is sufficiently heat-resistant to remain hardened at temperatures above 400° F. The press applies pressure and heat in excess of 400° F. to the layer of wood fibers and to the coated carrier sheet to compress the fibrous layer into an integral hardboard piece, while at the same time transferring the paint coat, in a hardened condition, from the carrier sheet and bonding it to a surface of the board. This provides hardboard having a separate finished painted surface.

The paint coat can be a thermosetting resinous system which is crosslinked while being coated onto the carrier. The paint coat can be in-press transferred to a relatively thick and substantially uncompressed layer of loose wood fibers. The carrier can include a synthetic resinous adherence coat which can be polymerized and crosslinked by the heat in the press to bond the paint coat to the fibers in the board as the board is being formed.

These and other aspects of the invention will be more fully understood by referring to the following detailed description and the accompanying drawings.

DRAWINGS

FIG. 1 is a cross-sectional schematic view illustrating one embodiment of a painted carrier used in the method of this invention;

FIG. 2 is a schematic side view showing a method for coating the painted carrier of FIG. 1;

FIG. 4 is a cross-sectional schematic view showing the press within the circle 4 of FIG. 3 prior to forming the hardboard.

DETAILED DESCRIPTION

Figure 3:
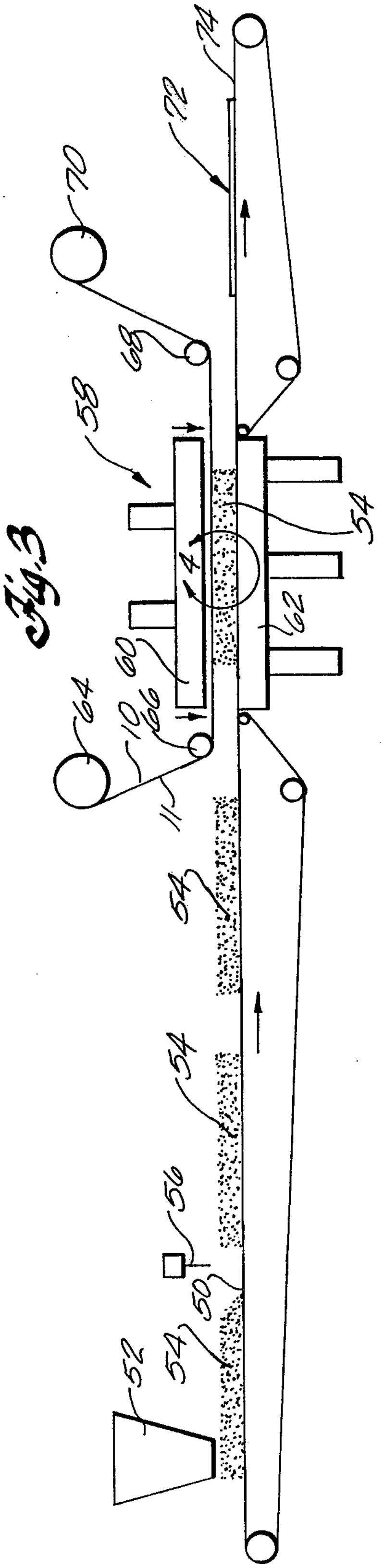
FIG. 3 is a schematic side view showing the painted carrier used in a process for forming hardboard in a press while simultaneously transferring a painted surface to the board.

A layer of paint is applied to the surface of a piece of hardboard in a press simultaneously while the hardboard is being formed in the press. The paint layer is applied by hot transfer techniques. The paint layer is initially coated onto a temporary carrier sheet. The raw material for forming the hardboard comprises exploded wood fibers comprising a mixture of wood fibers, fiber bundles and hard shives produced from whole wood, sawdust and mill residues, waste paper, agricultural wastes and plant tissue which has been subjected to thermomechanical pulping techniques. The raw material will be referred to herein as exploded wood fibers or a fibrous material or fibrous layer, for simplicity. The exploded wood fibers are placed in a loose layer in a heated press. The painted carrier is then preferably placed over an exposed surface of the wood fibers in the press, although the painted carrier can be placed under a layer of exploded wood fibers. Heat and pressure applied by the press compares the wood fibers and fuse them together to form a relatively rigid and dense hardboard piece, while at the same time transferring the paint coat from the carrier and bonding it to the board. The fibrous material in the press is heated to a temperature of more than 400° F. during formation of the hardboard. The paint coat is sufficiently heat-resistant that it remains in a hardened condition at or above the board-forming temperature. This provides a piece of hardboard having a separate hardened finished painted surface.

FIG. 1 illustrates the painted carrier which includes a carrier sheet 10 having a transferable adherent paint layer 11 coated onto it. The transferable adherent paint layer 11 comprises a release coat 12, a first abrasion coat 14, a second abrasion coat 16, a first print pattern color coat 18, a second print pattern color coat 20, a first background color coat 22, a second background color coat 24, and an adherence coat 26 coated over one another in succession. The abrasion coats and the color coats are referred to herein as paint coats for simplicity.

The carrier sheet 10 is preferably a flexible and foldable heat-resistant polyester film such as Celanar (trademark of Celanese Plastics Co.) or Mylar (trademark of E. I. du Pont De Nemours & Co.). Celanar having a thickness of 0.75 mil is preferred, although for higher temperature applications, the carrier can be aluminum foil, silicone coated paper, or Tedlar (trademark of E. I. du Pont de Nemours & Co. for polyvinylfluoride film) for example.

The release coat 12 is coated onto a surface of the carrier sheet 10. The release coat is preferably a material such as a wax, or a mixture of wax with other substances, which will melt below the board-forming temperature so that the paint coats can be released from the carrier at the board-forming temperature. The presently preferred release coat is a mixture of a hard natural wax, such as carnauba wax, dissolved in toluene and an organic solvent such as methyl ethyl ketone. A small amount of a low molecular weight acrylic resin can be added to help distribute the wax. The release coat has a melting point of about 175° F.

The abrasion coats 14 and 16 provide an abrasion- and chemical-resistant top coat for the paint layer 11. Two separate abrasion coats are used on the painted carrier illustrated in the drawings, but a single abrasion coat can be used. The abrasion coat also could be omitted if the first color coat, for example, provided sufficient abrasion and chemical resistance in and of itself. The abrasion coat is sufficiently heat-resistant when cured that it will remain hardened when subjected to board-forming temperatures in excess of at least 400° F. The preferred board-forming temperature range is 450° F. to 490° F., and the abrasion coat maintains its stable, i.e., hardened, condition at these temperatures. The preferred abrasion coat also resists discoloration at the board-forming temperatures. The abrasion coat is a transparent thermosetting resinous coating composition, and in one embodiment the abrasion coat includes an acrylic resin, an organic solvent such as methyl ethyl ketone, and a crosslinking resin such as a polyurethane for reacting with the acrylic resin. The abrasion coat is coated onto the carrier 10 in a liquid state, and heat is then applied to crosslink the coating to a hardened condition while the coating is on the carrier.

The gloss of the finished paint layer can be controlled by adding a flattening agent to at least the first abrasion coat 14.

The print pattern color coats 18 and 20 and the background color coats 22 and 24 provide coloration for a selected simulated wood grain pattern, although other design patterns or monochromatic pigmentation can be used. The print pattern color coats 18, 20 provide the thin darker lines or "ticking" in the wood grain pattern, and the background color coats 22, 24 provide a generally lighter background color. In the illustrated embodiment, both background color coats are identical, although it is possible to provide other combinations in a simulated wood grain pattern, such as three print pattern coats and one background color coat, if desired. For providing other surface finishes, such as a monochromatic paint coat, it may be necessary to apply such paint in several layers to obtain the desired paint layer thickness.

The print pattern color coats 18, 20 and the background color coats 22, 24 are similar to the abrasion coat in that they are sufficiently heat-resistant, when cured, that they remain hardened when subjected to board-forming temperatures at least above 400° F. The preferred color coats can maintain a hardened condition at temperatures in the preferred board-forming range of 450° F. to 490° F. The preferred color coats comprise a thermosetting resinous material which is coated onto the carrier in a liquid state and crosslinked on the carrier by application of heat. The presently preferred color coats comprise a urethane-acrylic crosslinking coating comprising an acrylic resin, an organic solvent such as methyl ethyl ketone, a urethane for reacting with the acrylic, and a pigment for providing the desired coloration.

The abrasion coats 14, 16 and the color coats 18, 20, 22, 24 can be formulated from other heat-resistant coating compositions such as other acrylics, urethanes, alkyds, silicones, polyesters, and fluorocarbons, for example, as long as the coating is cured or crosslinked to provide a coating which remains hardened at or above the board-forming temperature.

The adherence coat 26 is provided for bonding the paint coats (i.e., the abrasion coats and the color coats) to the hardboard as the board is being formed in the press. The adherence coat comprises a synthetic resinous material which is heat-activated by the heat from the press to bond the paint layer to the hardboard. The preferred adherence coat comprises a thermosetting resin which can penetrate fibers in the hardboard and crosslink under the heat applied from the press. In one embodiment, the adherence coat comprises a self-crosslinking phenolic resin, such as Bakelite (trademark of Union Carbide Corp.) mixed with an organic solvent and a filler. Alternatively, the adherence coat can include a blocked urethane such as Mondur HCB resin (trademark of Mobay Chemical Corp.). The adherence coat is applied to the carrier as a thermoplastic. It is coated onto the carrier in a liquid state and dried on the carrier at a temperature which evaporates the solvent without crosslinking the resin. The adherence coat is dried on the carrier at a temperature below the board-forming temperature. During the subsequent pressing operation, heat from the press crosslinks the adherence coat in the press, while the fibers in the board are penetrated by the adherence coat, which bonds the paint layer to the board.

FIG. 2 illustrates a coating apparatus which can be used for applying to the carrier 10 the release coat 12, each of the abrasion coats 14 and 16, each of the color coats 18, 20, 22, and 24, and the adherence coat 26. The release coat, the abrasion coats, the color coats, and the adherence coat are applied by eight separate coating stations for applying each coat to the carrier in succession. FIG. 2 illustrates the coating apparatus at any one of the coating stations. The carrier web 10 is initially supplied from a supply roll 28 and passes to a roller coater for coating a liquid coating composition 30 onto a surface on the carrier. The coating 30 can be the release coat, the abrasion or color coats, or the adherence coat. The coating apparatus includes a rotating cylinder 32 for applying the coating 30 to the underside of the carrier 10 against the pressure of an impression roller 34 on the opposite side of the carrier. The release coat, the abrasion coats, the background color coats, and the adherence coat are applied to the carrier as continuous films, in which case the cylinder 32 has a uniform surface. The print pattern color coats can be applied by gravure printing techniques, in which case the cylinder 32 can have a selected print pattern on its surface.

The coated carrier then passes to an oven 36 having forced hot air, infrared heat lamps, or the like, for heating the coatings applied by the cylinder 32. The oven dries each coating before the next coating is applied. The temperature at which a coating is heated depends upon the particular composition used. The abrasion coats and the color coats can be heated to a temperature in the range of about 250° F. to 325° F. for a curing time of about 2 to 20 seconds for crosslinking the reactive components in each of these paint layers. The adherence coat can be heated to about 270° F. for about 2 to 20 seconds to evaporate the solvent in the adherence coat without crosslinking the adherence coat. The release coat is applied as a liquid and dries on the carrier.

Each coating passes to a cooling station, if desired, for increasing the cooling rate of the coating in preparation for passing it to the next coating station. The carrier can pass from the oven 36 around a roll 42 and then around a cooling drum 44 at a cooling station. The coated carrier then can pass around a roll 46 upon leaving the cooling station and before passing to similar coating apparatus at the next coating station. The finished painted web shown in FIG. 1 is collected on a collection roll 48.

The finished painted web is then applied to hardboard formed in a production plant illustrated in FIG. 3. The production plant is illustrated schematically and is not shown to scale in FIG. 3 for simplicity. The production plant includes a first conveyor 50 for receiving a raw material for forming the hardboard. As described above, the raw material contains exploded or pulverulent cellulosic material, primarily wood fibers or particles such as the type of raw material used in making hardboard or fiberboard. In making hardboard the fibrous material contains essentially no added binders, and in making fiberboard the fibrous material contains less than about 5% added binders or other additives, by weight.

The fibrous material is contained in at least one hopper 52 for depositing a loose layer 54 of the material under gravity onto an upper surface of the conveyor 50. A plurality of side-by-side hoppers can be used, if desired, for depositing fibrous materials of various particle sizes for controlling the cross-section characteristics of the finished hardboard. Longitudinally spaced apart layers 54 of the fibrous material are deposited on the conveyor 50. The lateral edges of each layer are trimmed by a vertically reciprocating sawblade 56, and similar sawblades trim the longitudinal edges (i.e., in the direction of travel) of the layers 54.

Each layer 54, one by one, passes onto a conveyor belt (not shown) running through a heated vertical press 58. The press includes a heated upper platen 60 and a heated lower platen 62. Either of the platens is movable toward the other for applying heat above about 400° F. and pressure between about 400 to 1000 psi to the material in the press.

The finished painted web from the coating operation shown in FIG. 2 is then placed over the layer 54 in the press. The finished painted web from the collection roll 48 is used as a supply roll 64 and passes around a roll 66 adjacent the entrance to the press. A roll 68 adjacent the exit side of the press cooperates with the entrance roll 66 for aligning the painted carrier close to the top surface of each layer 54 in the press. As shown best in FIG. 4, the paint layer 11 is placed immediately above the exposed top surface of the fibrous layer 54, with the carrier 10 being on the side of the paint layer opposite the fibrous layer 54. Caul sheets (not shown) can be used between the material in the press and the upper and lower platens 60, 62.

The press is then closed so the platens can apply heat and pressure to the wood fibers to compress them and fuse them together to form an integral piece of hardboard. Simultaneously, the heat from the press transfers the paint coat from the carrier and bonds it to a top surface of the formed hardboard. Following the pressing step the press is opened and the carrier is stripped from the finished hardboard and collected on a collection roll 70. The finished hardboard 72 is then removed from the press on a conveyor 74. The next fibrous layer 54 is then fed into the press, and the next portion of the painted carrier is placed over the layer in the press, after which the press is closed, and so on.

Figure 5:
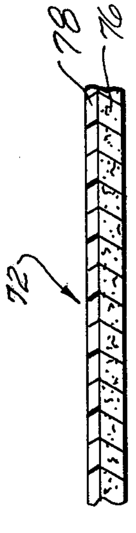
FIG. 5 is a cross-sectional schematic view illustrating a finished hardboard piece formed by the method of this invention.

Referring to FIG. 5, the finished hardboard 72 includes a substantially rigid and dense piece 76 of hardboard or fiberboard having a separate layer 78 of paint covering its surface, penetrating into the fibers of the board and bonded to the fibers of the board. In the embodiment illustrated in the drawings, the paint layer 78 is a simulated wood grain finish.

The press platens are heated to a temperature at least in excess of 400° F. and the dwell time is sufficient to raise the temperature of the wood fibers and the painted carrier to more than 400° F. The presently preferred board-forming temperature is between 450° F. to 490° F., and the presently preferred dwell time is about 1½ to 5 minutes. The paint coat is sufficiently heat-resistant that it will remain in a hardened condition, i.e., will not melt or otherwise thermoplastically deform, at the temperature at which the board is formed. The paint coat is crosslinked during the coating operation to form a hard paint layer on the carrier, and the heat from the press does not cause the paint coat to soak into the fibers of the board or otherwise disturb the physical characteristics of the cured paint system. The paint coat is thus bonded to the surface of the hardboard as a separate and continuous layer of paint. If the paint coat is thermoplastic at the board-forming temperature, or at least is unstable to the extent that it melts or otherwise plastically deforms or cold flows, it can penetrate into the board, such as by soaking into the wood fibers near the top of the board. In this instance, the paint coat disappears into the board and does not provide the desired continuous and separate paint layer on the surface of the finished board.

The paint coat can be effectively transferred to a loose uncompressed layer of wood fibers in the press, without requiring a separate prepressing step, or the like, before the fibrous layer enters the press. It has been discovered that such a transfer can successfully occur despite the substantial compression ratio and resulting dimensional changes and release of water vapor which occur in the press when the fibers are being compressed into a rigid board, and despite the fact that the paint coat being transferred does not have structural integrity in and of itself.

The minimum thickness of the paint layer 11 is about 0.5 mil, inasmuch as a thinner paint layer may not prevent fibers from the finished hardboard from appearing in the top surface coating. The paint layer applied by principles of this invention can be thinner than that applied by a separate painting step after the board is formed and removed from the press.

The paint layer 11 has a degree of extensibility provided by the resin components of the coatings comprising the paint layer. Such extensibility is sufficient to inhibit cracking of the finish from the dimensional and temperature changes occurring when the board is formed.

The carrier 10 also has a degree of elongation, and coupled with the extensibility of the paint layer 11, a finished painted surface can be in-press transferred to a board being formed with embossed or three-dimensional surface patterns. A portion of the paint layer can be transferred to a flat board surface while an adjacent portion of the paint layer can elongate sufficiently to transfer to a raised portion of the board, and yet the finished painted surface appears as a continuous coat of paint.

The following are examples of coating suitable for providing a simulated wood grain surface finish on hardboard according to principles of this invention.

EXAMPLE 1—Release Coat

The following ingredients were mixed in the proportions indicated to form the release coat 12.

| | Parts |
|---|---|
| Toluene | 89.0 |
| Carnauba wax (OP wax - American Hoechst corp.) | 0.4 |
| Methyl ethyl ketone | 10.1 |
| Low molecular weight acrylic resin (Aroset 1081 resin - Ashland Chemical Co.) | 0.5 |

7.5 parts of toluene were heated to 130° F. for dissolving the wax. The dissolved wax was then added to a mixture of 81.5 parts toluene containing the methyl ethyl ketone solvent and the low molecular weight acrylic. The resulting release coat had a melting point of about 175° F.

EXAMPLE 2—Abrasion Coats

The first abrasion coat 14 was prepared from the following ingredients:

| | Parts |
|---|---|
| Methyl ethyl ketone | 53.2 |
| Acrylic resin (G-Cure TSAX-11108 - General Mills Chemicals, Inc.) | 31.7 |
| Silica (Syloid 244 - Davidson Div. of W.R. Grace & Co.) | 8.0 |
| Polyurethane Desmodur N-100 - Mobay Chemical Corp.) | 7.1 |

The acrylic resin and silica were dispersed in 40.0 parts of the methyl ethyl ketone solvent, and 13.2 parts of the solvent were added to adjust viscosity. 0.1 parts of the 8% zinc naphthenate was added as a polymerization catalyst. The urethane was then added carefully with vigorous agitation.

The second abrasion coat 16 was prepared by thoroughly mixing the following ingredients:

| | Parts |
|---|---|
| Methyl ethyl ketone | 43.0 |
| Acrylic - low weight molecular resin (G-Cure TSAX-11108) | 57.0 |

75.0 parts of this mixture was dispersed thoroughly with 25.0 parts of the formulation used in the first abrasion coat 14. 9.5 parts of the urethane resin (Desmodur N-100) was then added to the mixture to form the second abrasion coat 16.

EXAMPLE 3—Print Pattern Coats

A first intermediate formulation was prepared with the following ingredients:

| | Parts |
|---|---|
| Methyl ethyl ketone | 24.8 |
| Acrylic resin (G-Cure TSAX-11108) | 22.6 |
| Filler ($Al_2O_3 . (H_2O)_3$) (Hydral 710 - Aluminum Co. of America) | 52.6 |

A second intermediate formulation was prepared from the following ingredients:

| | Parts |
|---|---|
| Methyl ethyl ketone | 31.9 |
| Acrylic resin (G-Cure TSAX-11108) | 28.1 |
| Black pigment - black iron oxide (Mapico Black - Columbian Chemicals Div., Cities Service Co.) | 40.0 |

A third intermediate formulation was prepared from the following ingredients:

| | Parts |
|---|---|
| Methyl ethyl ketone | 30.0 |
| Acrylic resin (G-Cure TSAX-11108) | 29.5 |
| Yellow pigment - yellow iron oxide (VLO-1888 - Pfizer, Inc.) | 36.0 |

The acrylic resin and the yellow pigment were dispersed in the methyl ethyl ketone solvent, and an additional 4.5 parts of methyl ethyl ketone solvent was added, as necessary, to adjust viscosity.

A fourth intermediate formulation was prepared from the following ingredients:

| | Parts |
|---|---|
| Methyl ethyl ketone | 22.0 |
| Acrylic resin (G-Cure TSAX-11108) | 29.5 |
| Red pigment - red iron oxide (R-1299 - Pfizer, Inc.) | 45.0 |

The acrylic resin and the pigment were dispersed in the methyl ethyl ketone solvent, and 3.5 parts of methyl ethyl ketone solvent was added, as necessary, to adjust viscosity.

The first print pattern color coat 18 was prepared from the following ingredients:

| | Parts |
|---|---|
| First Intermediate | 47.6 |
| Second Intermediate | 47.6 |
| Urethane resin (Desmodur N-100) | 4.8 |

The first and second intermediates were dispersed thoroughly and the urethane was then added carefully with vigorous agitation.

The second print pattern color coat 20 was prepared from the following ingredients:

| | Parts |
|---|---|
| First Intermediate | 66.6 |
| Second Intermediate | 21.2 |
| Third Intermediate | 4.2 |
| Fourth Intermediate | 3.2 |
| Urethane resin (Desmodur N-100) | 4.8 |

The intermediate formulations were dispersed thoroughly and the urethane was then added carefully with vigorous agitation.

EXAMPLE 4—Background Color Coats

The first and second background color coats contained identical formulations and were prepared from the following ingredients:

| | Parts |
|---|---|
| Methyl ethyl ketone | 30.4 |
| Acrylic resin (G-Cure TSAX-11108) | 27.5 |
| Yellow iron oxide pigment (VLO-1888) | 22.5 |
| Red iron oxide pigment (R-1299) | 9.0 |
| Black iron oxide pigment (Mapico Black) | 4.5 |
| Urethane resin (Desmodur N-100) | 6.1 |

The acrylic resin and the pigments were dispersed in the solvent, and the urethane was then added carefully with vigorous agitation.

EXAMPLE 5—Adherence Coat

The adherence coat 26 was prepared from the following ingredients:

| | Parts |
|---|---|
| Methyl ethyl ketone | 45.0 |
| Phenolic resin (Bakelite BKR 2620 - Union Carbide Corp.) | 27.5 |
| Filler (Hydral 710) | 27.5 |

The phenolic resin was dissolved in the methyl ethyl ketone solvent and the filler was added slowly with vigorous agitation. The phenolic resin is self-crosslinking under high temperatures above about 350° F. The adherence coat was coated onto the carrier and heated at about 270° F. to evaporate the solvent to dry the adherence coat without curing it. At the board-forming temperature of more than 400° F. the phenolic resin penetrates the fibers of the board and is self-crosslinked in the press.

Thus, the present invention provides a hardboard having a finished painted surface which can be applied simultaneously with formation of the board. The process saves time and energy and reduces pollution as well as other production costs when compared with the prior art process of forming hardboard and separately applying a decorative finish. The process of this invention eliminates the need for a separate production plant for applying painted finishes or laminae after the board is formed. The need for a separate press for prepressing the wood fibers before the finished board is formed in the press also is eliminated. By transferring the painted surface in the press, a flexible painted carrier can be used. This facilitates automatically applying a painted decorative surface, such as a simulated wood grain or other complex decorative finishes, to hardboard surfaces formed with a variety of three-dimensional shapes.

I claim:

1. A method for manufacturing hardboard having a painted surface comprising:

forming a loose layer containing wood fibers;

placing over the loose fibrous layer a temporary carrier sheet having a paint layer coated thereon, the paint layer including a pre-hardened paint coat comprising a pigmented synthetic resinous material on the carrier sheet, the paint coat being sufficiently heat-resistant to remain hardened under a temperature in excess of 400° F.; and applying pressure and heat in excess of 400° F. to the fibrous layer and to the paint layer coated on the carrier sheet to compress the fibrous layer and form an integral hardboard piece while at the same time transferring the paint coat from the carrier to a surface of the formed board, the paint coat remaining in the hardened condition throughout formation of the board and transfer to the surface of the board to provide hardboard having said paint coat bonded to its surface.

2. The method according to claim 1 in which the carrier sheet and the paint layer are flexible and have a degree of elongation.

3. The method according to claim 1 in which the paint coat is sufficiently heat-resistant to remain hardened at a temperature in excess of 450° F., and simultaneously applying pressure and heat in excess of 450° F. to the fibrous layer and the painted carrier sheet.

4. The method according to claim 1 in which the paint coat consists essentially of a thermosetting resinous material applied to the carrier and crosslinked on the carrier prior to being placed over the fibrous layer.

5. The method according to claim 4 in which the paint layer includes an adherence coat adjacent the paint coat, the adherence coat being thermally-activated to bond the paint coat to the board from the heat applied during formation of the board.

6. The method according to claim 5 in which the adherence coat is coated onto the carrier in a thermoplastic state and is crosslinked from the heat applied during formation of the board to bond the paint coat to the board.

7. The method according to claim 1 in which the paint layer includes an adherence coat adjacent the paint coat; and including placing the carrier sheet over the fibrous layer so the adherence coat is adjacent the fibrous layer, the adherence coat being thermally-activated to bond the paint coat to the hardboard from the heat applied during formation of the board.

8. The method according to claim 7 in which the adherence coat comprises a thermosetting resinous material which is crosslinked from the heat applied during formation of the board.

9. The method according to claim 1 including applying pressure in excess of about 400 psi to compress the fibrous layer.

10. The method according to claim 1 in which the fibrous layer is compressed between about 8 to about 16 times its original thickness for forming the hardboard.

11. The method according to claim 10 in which the paint layer has a thickness of at least about 0.5 mil.

12. The method according to claim 1 including forming the hardboard in a press having platens heated to a temperature in excess of 400° F., and including applying pressure in excess of about 400 psi to compress the fibrous layer.

13. The method according to claim 12 in which the dwell time during the pressing and heating step is from about 1½ to 5 minutes.

14. The method according to claim 1 in which the fibrous layer consists essentially of exploded and pulverulent cellulosic material.

15. A method for manufacturing hardboard having a painted surface comprising:

coating a paint layer onto a temporary carrier sheet, the paint layer including a continuous paint coat having a heat resistance greater than 400° F. and consisting essentially of a pigmented thermosetting resinous material cross-linked to a hardened condition on the carrier;

placing a loose layer containing wood fibers in a heated press;

placing the painted carrier over an exposed surface of the loose fibrous layer so the paint layer is adjacent the fibrous layer; and applying pressure and heat in excess of 400° F. to the fibrous layer and the paint layer on the carrier to compress the fibrous layer to form an integral hardboard piece and at the same time to transfer the paint coat from the carrier onto a surface of the formed hardboard, the paint coat being sufficiently heat-resistant to remain in said hardened condition throughout formation of the board and transfer to the surface of the board to provide hardboard having a separate and continuous paint coat on its surface.

16. The method according to claim 15 including applying pressure above about 400 psi to the painted carrier and the loose fibrous layer.

17. The method according to claim 15 in which the paint coat is formed by coating an abrasion-resistant coat adjacent the carrier, and coating one or more color coats adjacent the abrasion coat.

18. The method according to claim 17 including coating a release coat between the carrier and the abrasion coat.

19. The method according to claim 18 in which the paint coat includes an adherence layer coated adjacent the color coat, the adherence coat being heat-activated from the heat applied during formation of the board to bond the paint coat to the board.

20. The method according to claim 19 in which the adherence coat comprises a thermosetting synthetic resinous material which is coated onto the carrier in a thermoplastic state but crosslinks in the press from the heat applied during formation of the board.

21. The method according to claim 20 in which the paint coat remains hardened at temperatures above about 450° F.

22. The method according to claim 20 in which heat is applied to dry the adherence coat on the carrier, and in which the heat for drying the adherence coat is below 400° F.

23. The method according to claim 15 in which the fibrous layer consists essentially of exploded and pulverulent cellulosic material.

24. The method according to claim 15 in which the carrier sheet and the paint layer are flexible and have a degree of elongation.

25. The method according to claim 24 in which the paint coat contains a urethane resin.

26. The method according to claim 15 in which the paint coat contains an acrylicurethane crosslinking resin.

27. In a method for manufacturing hardboard comprising the steps of placing in a heated press a substantially uncompressed layer consisting essentially of exploded and pulverulent cellulosic material and applying pressure in excess of 400 p.s.i. and heat in excess of 400° F. to the layer of cellulosic material to form an integral hardboard piece, the improvement comprising the steps of:

coating a paint layer onto a temporary carrier sheet, the paint layer including a continuous paint coat consisting essentially of a pigmented thermosetting resinous material cross-linked to a hardened condition on the carrier and having a heat resistance above 400° F.;

placing the painted carrier over an exposed surface of the uncompressed layer of cellulosic material so that the paint layer is adjacent the cellulosic layer; and applying pressure in excess of 400 p.s.i. and heat in excess of 400° F. to compress the layer of cellulosic material and simultaneously transfer the paint coat from the carrier to a surface of the formed hardboard, the paint coat being sufficiently heat-resistant to remain in said hardened condition throughout formation of the board and transfer to the surface of the board for providing a separate and continuous paint coat on the surface of the hardboard.

28. The improvement according to claim 27 in which the paint layer includes a color coat and an adherence coat coated adjacent the color coat, the adherence coat being heat-activated from the heat applied during formation of the board to bond the color coat to the board, the adherence coat comprising a thermosetting, synthetic resinous material which is coated onto the carrier in a thermoplastic state but which crosslinks in the press from the heat applied during formation of the board.

29. The improvement according to claim 27 in which the layer of cellulosic material is compressed between about 8 to about 16 times its original thickness for forming the hardboard.

30. The improvement according to claim 27 in which the paint coat is sufficiently heat-resistant to remain hardened at a temperature in excess of 450° F., and including the step of simultaneously applying pressure and heat in excess of 450° F. to the layer of cellulosic material and the painted carrier sheet.

* * * * *